US005493327A

United States Patent [19]

McCallum et al.

[11] Patent Number: 5,493,327

[45] Date of Patent: Feb. 20, 1996

[54] METHOD AND APPARATUS FOR PRODUCING IMAGE REPRODUCING MATERIALS USING PHOTOTHERMOGRAPHIC MATERIAL SENSITIVE TO RADIATION IN THE RED REGION AND TRANSPARENT TO RADIATION IN THE ULTRAVIOLET RANGE OF THE ELECTROMAGNETIC SPECTRUM

[75] Inventors: William G. McCallum, Maplewood; Richard C. Cotner, Stillwater, both of Minn.

[73] Assignee: Minnesota Mining and Manufacturing Company, St. Paul, Minn.

[21] Appl. No.: 72,155

[22] Filed: Jun. 4, 1993

[51] Int. Cl.[6] .................................................. G01D 18/16

[52] U.S. Cl. .................................. 347/262; 346/135.1

[58] Field of Search .................................. 342/139, 153, 342/163, 221, 262, 264; 346/134, 135.1; 430/349

[56] References Cited

U.S. PATENT DOCUMENTS

| | | | |
|---|---|---|---|
| 3,457,075 | 7/1969 | Morgan | 96/67 |
| 3,619,335 | 11/1971 | Bryan | 161/1 |
| 3,700,458 | 10/1972 | Lindholm | 96/114.1 |
| 3,769,019 | 10/1973 | Wiese, Jr. et al. | 96/84 |
| 4,196,002 | 4/1980 | Levinson et al. | 430/617 |
| 4,308,379 | 12/1981 | Goettert | 542/457 |
| 4,409,316 | 10/1983 | Zeller-Pendrey et al. | 430/263 |
| 4,477,562 | 10/1984 | Zeller-Pendrey | 430/513 |
| 4,581,325 | 4/1986 | Kitchin et al. | 430/522 |
| 4,619,892 | 10/1986 | Simpson et al. | 430/505 |
| 4,803,497 | 2/1988 | Kennedy, Jr. et al. | 346/108 |

FOREIGN PATENT DOCUMENTS

| | | | |
|---|---|---|---|
| 89.312472.7 | 8/1992 | European Pat. Off. | B41M 5/38 |
| 1261102 | 2/1969 | United Kingdom | G03C 1/40 |
| 312472.7 | 12/1988 | United Kingdom . | |

OTHER PUBLICATIONS

T. H. James, "The Theory of the Photographic Process", 4th Edition, Chapter 20, Macmillan 1977 Product Brochure, 3M Dry Silver Film Type 8500.

D. G. Herzog and L. W. Dobbins, "Performance Comparisons of Electrophotographic, Dry Silver, and Wet Processed Recording Media Exposed with Gar Laser and Laser Diode Light Sources for Image Recording", pp. 149–154, Recording Systems, RCA Government Communications Systems, Camden New Jersey.

Bruno, Michael H., *Principles of Color Proofing, GAMA Communications*, Chapter II, "The Color Reproduction Process".

Blair and Destree, *The Lithographers Manual*, The Graphic Arts Technical Foundation, Inc., Pittsburgh, Pennsylvania (1988), Chapter 11, "Platemaking".

*Research Disclosure*, Jun. 1978, item 17029.

T. N. James, *The Theory of the Photographic Process*, Fourth Edition, Chapter 5, pp. 149–169.

*Primary Examiner*—Mark J. Reinhart
*Attorney, Agent, or Firm*—Gary L. Griswold; Walter N. Kirn; William D. Bauer

[57] ABSTRACT

Method and apparatus for producing image reproducing materials, especially newspaper printing plates or proofs having a predetermined image. A photothermographic material having a polymeric base supporting at least one photosensitive layer, capable of being developed by heat, is exposed to radiation at a first wavelength modulated in accordance with the predetermined image to produce a latent image representing the predetermined image in the photothermographic material. The photosensitive layer contains an antihalation colorant in an amount greater than 0.02 percent by weight. The antihalation colorant is active to radiation in the first wavelength and is transparent to radiation at a second wavelength. The photothermographic material is heated to develop the latent image in the photothermographic material. The image reproducing material is imaged with radiation at the second wavelength using the photothermographic material as a mask.

34 Claims, 2 Drawing Sheets

METHOD AND APPARATUS FOR PRODUCING IMAGE REPRODUCING MATERIALS USING PHOTOTHERMOGRAPHIC MATERIAL SENSITIVE TO RADIATION IN THE RED REGION AND TRANSPARENT TO RADIATION IN THE ULTRAVIOLET RANGE OF THE ELECTROMAGNETIC SPECTRUM

TECHNICAL FIELD

This invention relates generally to methods and apparatus for producing image reproducing materials and, more particularly to methods and apparatus for producing printing plates or proofs using photographic film.

BACKGROUND OF THE INVENTION

Photographic film is used in the process of creating image reproducing materials. Included within the definition of image reproducing materials are materials made in contact mode including printing plates, proofs (proofing materials), films and resists, including printed circuit board resists.

The preparation of printing plates or proofs utilized in the newspaper printing industry involves several steps. A latent image representing a computer based image is placed on a photographic film. The latent image in the film is then developed. The developed film is then placed next to a photographic plate, or proof, and exposed to ultraviolet light. The ultraviolet light creates a pattern in the photographic plate corresponding to the developed image. The plate can then be inked and used to print the newspaper copy. Correspondingly, the proof created from the developed film can be viewed.

Creation of the latent image on a photographic film typically uses computer driven imagesetting equipment. Such imagesetting equipment, well known in the art, uses a computer based image to drive a radiation generator, generally a laser, laser diode or cathode ray tube, which is scanned across radiation sensitive film. Modulation of the radiation based upon the computer based image creates a corresponding image on the radiation sensitive film.

In this industry and others, imaging materials sensitized to the red may be used to produce hard copy from computer stored graphics data using a scanning laser diode source. In particular, halftone graphic art contact films can be generated which can be used in the color reproduction process to image ultraviolet photosensitive materials, such as printing plates or proofs and color proofing films. There is a need for photographic elements containing higher concentrations of antihalation and acutance dyes which absorb in the red region of the electromagnetic spectrum with little or no absorption in the ultraviolet region of the electromagnetic spectrum.

The silver halide film utilized in this process is traditionally wet chemistry photographic film. Such wet chemistry film provides the necessary acuity and density. However, the use of wet chemistry in the development of the image incurs a substantial environmental impact, a significant cost of and in maintaining the chemistry and involves a substantial time impact in the process.

The increasing availability and/or use of higher output gas lasers or light emitting diodes emitting in the red region of the electromagnetic spectrum has created the opportunity to use photothermographic imaging materials in place of conventional silver halide materials which are sensitive to this region. Due to environmental concerns, it is desirable to replace conventional silver halide materials which are processed by known 'wet' chemistries with 'dry' processed materials. Wet processing produces waste materials which are becoming more difficult to dispose of, both commercially and environmentally. Dry processed materials do not suffer from these disposal considerations.

Photothermographic film is also well known in the art. U.S. Pat. No. 3,457,075, Morgan et al, Sensitized Sheet Containing an Organic Silver Salt, a Reducing Agent and a Catalytic Proportion of Silver Halide, assigned to Minnesota Mining and Manufacturing Company, the assignee of the present invention, describes a light sensitive film for dry photography which form high contrast images when exposed to a light image and then uniformly moderately heated. The sensitized sheet described in Morgan et al is commonly known as a photothermographic film or "dry silver" film.

Photothermographic imaging systems are those imaging materials which, upon first being exposed to light in an image-wise fashion, produce an image when subsequently heated, The exposure to light or other radiation photoactivates or photodeactivates a component in the imageable element and subsequent heating causes an image forming reaction to differentially occur in exposed and unexposed regions. It is because the exposure and development of the imaging systems occur without using water, that these materials are often referred to as dry silver materials.

Such dry silver film, however, is not suitable for use with the above described process for producing newspaper printing plates or proofs. Typically, either the laser power is too low, the film speed too slow, or both.

If a higher power laser is utilized in the process, light scattering, or halation, becomes a significant problem. This produces loss in exposure latitude making it difficult to achieve acceptable performance in a consistent manner.

Light sensitive recording materials may suffer from a phenomenon known as halation which causes degradation in the quality of the recorded image. Such light which strikes the photosensitive layer is not absorbed but passes through to the film base on which the photosensitive layer is coated. A portion of the light reaching the base may be reflected back to strike the photosensitive layer from the underside. Light thus reflected may, in some cases, contribute significantly to the total exposure of the photosensitive layer. Any particulate matter in the photosensitive element may cause light passing through the element to be scattered. Scattered light which is reflected from the film base will, on its second passage through the photosensitive layer, cause exposure over an area adjacent to the point of intended exposure. It is this effect which leads to image degradation. Photothermographic materials are prone to this form of image degradation since the photosensitive layers contain light scattering particles. The effect of light scatter on image quality is well documented, and is described, for example, in T. H. James "The Theory of the Photographic Process", 4th Edition, Chapter 20, Macmillan 1977.

In order to improve the sharpness or definition of photographic images an antihalation layer is often incorporated into photosensitive compositions. To be effective, the active ingredient in the antihalation layer will absorb at the wavelengths oat which the photosensitive composition is sensitive. The longer the path length of the light in the layer of light-sensitive composition, the greater the attenuation. Therefore, scattered light is attenuated or absorbed to a larger extent than light which impinges directly on a light-sensitive crystal. As a result, although the overall speed of the composition is reduced slightly, scattered light and other light rays which are liable to produce a blurred image are preferentially absorbed and so the overall definition and sharpness of images produced in the layer are increased.

Antihalation compounds, known in the art as acutance agents, are dyes or pigments that can be incorporated into photosensitive systems. Preferably they are heat lablie in the system, that is to say, they are degraded by the heat development of the photothermographic composition to one or more compounds which are substantially colorless. The exact mechanism of this reaction is not known. Such acutance agents are disclosed in, for example, U.S. Pat. No. 4,308,379.

United Kingdom Patent No. 1,261,102, Minnesota Mining and Manufacturing Company, Transparent Heat-Developable Photosensitive Sheet Material, describes the use of transparent heat-developable light sensitive materials. The "image sharpness or acutance of these "dry silver" transparencies [is improved] by incorporating in the sensitive layer small proportions of light-absorptive colouring matter" (Page 1, lines 41–44). The materials described in the UK '102 patent specifically requires that "the amount of coloured material added directly to the silver salt composition must be kept small since the color necessarily will remain in the image layer" (Page 1, lines 53–57).

The photosensitive sheet material described in the UK '102 is not suitable for use in the plate producing process described above. Imagesetting equipment used to produce film for this process have a power, typically 1 milliwatt, due to the necessary speed of travel of the laser in the imagesetter and the requirement for optical densities of 2.5 or greater. At this power level, the halation problem is not resolved. The photosensitive material described in the UK '102 patent creates unacceptable dot gain and unacceptable edge acuity.

Alternatively, antihalation compounds can be included in a layer separate from the radiation-sensitive layer. U.S. Pat. No. 4,477,562, Zeller-Pendrey, Dry Strippable Antihalation Layer for Photothermographic Film, assigned to Minnesota Mining and Manufacturing Company, the assignee of the present invention, describes a strippable antihalation layer which can be used with a photothermographic film. The antihalation layer is placed in a separate strippable layer because, in part, it is advantageous so as to avoid stain in the imaged area (Col. 2, lines 45–48). Similarly the aforementioned UK '102 patent also describes the use of a large amount of antihalation material in a separate strippable layer. The "image sharpness or acutance of these "dry silver" transparencies [is improved] by incorporating relatively large proportions of such coloured materials in separate layers which may subsequently be removed by a dry stripping process" (Page 1, lines 41–50). The materials described in the UK '102 patent specifically requires that "very much larger quantities of coloured material may be employed in coatings provided they are subsequently to be removed" (Page 1, lines 80–83).

The photosensitive material described in both of these documents locate the large amount of antihalation material in a separate layer which must be removed from the film before the film is used.

Similarly, U.S. Pat. No. 3,769,019, Wiese Jr., et al, Light and Heat Sensitive Sheet Material, describes a photosensitive sheet material having a first colored heat-bleachable layer to prevent light scattering/reflection back into a second transparent light-sensitive heat-developable "dry silver" layer as the material is exposed to a light image. The sheet is then heated to develop the visible image in the second layer. The heating simultaneously causes discharge of the color in the colored first layer so that non-image areas of the developed print are transparent.

As in the Zeller-Pendrey '562 and in the UK '102 patent, the antihalation material contained in the photosensitive sheet described in the Wiese Jr. et al patent must undergo another processing step to eliminate the colored antihalation material before the photosensitive sheet can be used for further processing steps.

Thus, these prior art photosensitive systems require either that the antihalation material is kept small or require that the antihalation material be contained in a separate layer that is removed from the material or rendered colorless.

U.S. Pat. No. 4,581,325, Kitchen et al, Photographic Elements Incorporating Antihalation and/or Acutance Dyes, and the similar Great Britain Patent Specification No. 89.312472.7, Infrared-Sensitive Photographic Materials Incorporating Antihalation and/or Acutance Dye, describe a conventional wet processed type or dry silver type photographic element which includes an antihalation dye which absorbs in the near infrared (above 700 nanometers) and has a relatively low visible absorption. This material is also unsuitable for use in the above-described process for producing newspaper printing plates or proofs for imagesetting equipment that radiates radiation in the 630–700 nanometer range. Hence, the antihalation material would be ineffective at these wavelengths.

SUMMARY OF THE INVENTION

The present invention provides a method and apparatus for producing image reproducing materials, especially printing plates or proofs (proofing materials) and newspaper printing plates, using an imagesetter, preferably having a high power laser, or a laser diode, preferably active in the red wavelength range, using a novel photothermographic material and a printing plate or proof imager, preferably active in the ultraviolet wavelength range. The method and apparatus of the present invention utilize a photothermographic material having a dry chemistry and, hence, no "wet processing" required. Dot gain and edge acuity is maintained even at the high power levels of radiation emitted by the imagesetting equipment and at optical densities of 2.5 or greater which are needed for processes for creating image reproducing materials, including newspaper plate or proof producing processes.

The method and apparatus of the present invention uses a photothermographic material directly. First, the photothermographic material is imaged by the use of imagesetting equipment emitting radiation at a first wavelength, typically 630–700 nanometers. The latent image on the photothermographic material is then developed by the application of heat. The photothermographic material is then used directly with conventional equipment to create the image reproducing material activated with radiation at a second non-visible wavelength, typically ultraviolet radiation. The high levels of antihalation material in the photothermographic material provide sufficient antihalation to meet the edge acuity and dot gain requirements.

The present invention provides a method for producing an image reproducing material having a predetermined image. A photothermographic material having a polymeric base supporting at least one photosensitive layer, capable of being developed by heat, is exposed to radiation in the range of the 630–700 nanometers modulated in accordance with the predetermined image to produce a latent image representing the predetermined image in the photothermographic material. The photothermographic material contains an antihalation colorant in an amount greater than 0.02 percent by weight. The antihalation colorant is active to radiation in the red range of the electromagnetic spectrum and is transparent to radiation in the ultraviolet range of the electromagnetic spectrum. The photothermographic material is heated to develop the latent image in the photothermographic material. The image reproducing material is imaged with ultraviolet radiation using the photothermographic material as a mask.

In another embodiment, the present invention provides a method for producing an image reproducing material having a predetermined image. A photothermographic material having a polymeric base supporting at least one photosensitive layer, capable of being developed by heat, is exposed to radiation at a first wavelength modulated in accordance with the predetermined image to produce a latent image representing the predetermined image in the photothermographic material. The photothermographic material contains an antihalation colorant in an amount greater than 0.02 percent by weight of the photosensitive layer. The antihalation colorant is active to radiation in the first wavelength and is transparent to radiation at a second wavelength. The photothermographic material is heated to develop the latent image in the photothermographic material. The image reproducing material is imaged with radiation at the second wavelength using the photothermographic material as a mask. It is preferred that the first wavelength is in the range of from 630 to 700 nanometers and that the second wavelength is in the range of from 360 to 450 nanometers.

It is preferred that the exposing step is accomplished with a heliumneon laser having at a power level of at least 5 milliwatts. It is preferred that the imaging step directly follows the heating step.

In another embodiment, the present invention is an apparatus for producing an image reproducing material having a predetermined image. The apparatus has means for exposing a photothermographic material having a polymeric base supporting at least one photosensitive layer, capable of being developed by heat, to radiation in the range of the 630–700 nanometers modulated in accordance with the predetermined image to produce a latent image representing the predetermined image in the photothermographic material. The photothermographic material contains an antihalation colorant in an amount greater than 0.02 percent by weight. The antihalation colorant is active to radiation in the red range of the electromagnetic spectrum and is transparent to radiation in the ultraviolet range of the electromagnetic spectrum. A means for heating heats the photothermographic material to develop the latent image in the photothermographic material. A means for imaging images the image reproducing material with ultraviolet radiation using the photothermographic material as a mask.

In another embodiment, the present invention is an apparatus for producing an image reproducing material having a predetermined image. A means for exposing exposes a photothermographic material having a polymeric base supporting at least one photosensitive layer, capable of being developed by heat, to radiation at a first wavelength modulated in accordance with the predetermined image to produce a latent image representing the predetermined image in the photothermographic material. The photothermographic material contains an antihalation colorant in an amount greater than 0.02 percent by weight. The antihalation colorant is active to radiation in the first wavelength and is transparent to radiation at a second wavelength. A means for heating heats the photothermographic material to develop the latent image in the photothermographic material. A means for imaging images the image reproducing material with radiation at the second wavelength using the photothermographic material as a mask.

It is preferred that the means for exposing comprises a laser having an output power of at least 5 milliwatts. It is preferred that the laser comprises a helium-neon laser. It is preferred that the helium-neon laser has an output power of approximately 10 milliwatts.

It is preferred that wherein the antihalation colorant comprises a ultraviolet transparent acutance dye. It is preferred that the ultraviolet transparent acutance dye comprises V.P.B. (victoria pure blue). It is preferred that the at least one photosensitive layer further comprises a photographic silver salt, an organic silver salt, a reducing agent for the organic silver salt, a binder and a stabilizer. It is preferred that the concentration of V.P.B. be in the range of 0.02 to 0.09 percent by weight of the photosensitive layer.

BRIEF DESCRIPTION OF THE DRAWINGS

The foregoing advantages, construction and operation of the present invention can be more readily understood by reference to the accompanying description and the following drawings in which.

DETAILED DESCRIPTION OF THE PREFERRED EMBODIMENTS

Photothermographic Material

Figure 1:
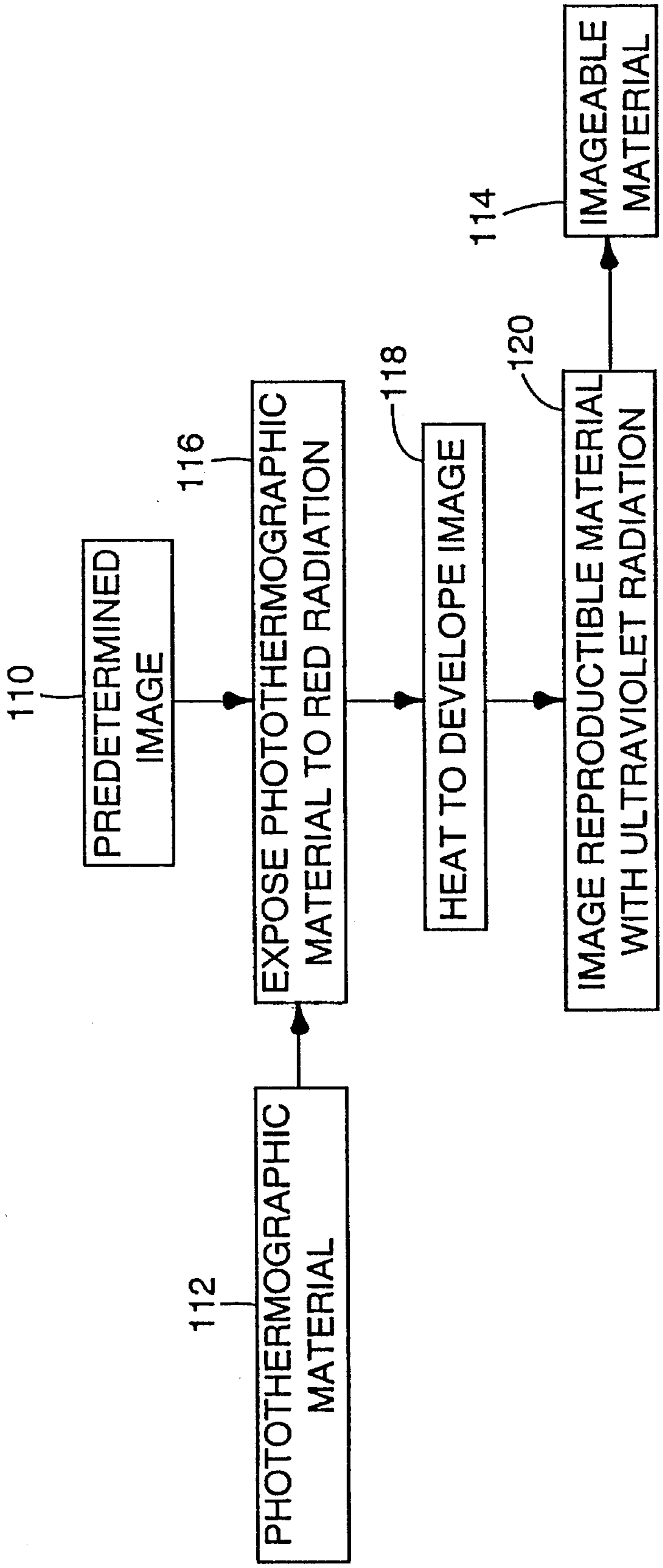
FIG. 1 is a flow chart illustrating the method of the present invention.

The preferred embodiment of the present invention involves the use of a novel photothermographic material.

Photothermographic film is well known in the art. U.S. Pat. No. 3,457,075, Morgan et al, Sensitized Sheet Containing an Organic Silver Salt, a Reducing Agent and a Catalytic Proportion of Silver Halide, which is hereby incorporated by reference, describes a light sensitive film for dry photography which form high contrast images when exposed to a light image and then uniformly moderately heated. The sensitized sheet described in Morgan et al is commonly known as a photothermographic film or "dry silver" film. Such dry silver film, however, is not suitable for use with the method and apparatus of the present invention.

3M dry silver film, Type 8500, available from Minnesota Mining and Manufacturing Company, St. Paul, Minn., is an improved dry silver film based upon the material described in the Morgan et al patent. This 3M Type 8500 film consists of a polyester base and a photosensitive coating. The polyester base is dimensionally stable after processing and is resistant to tearing and stretching. The coating is sensitive to light emitted from cathode ray tubes, lasers, laser diodes and light emitting diodes. The photosensitive layer of the Type 8500 dry silver film contains a small amount, namely less than 0.0025 percent by weight of the photosensitive layer, of an acutance dye commonly available under the trade name V.P.B., or victoria pure blue, namely C.I Basic Blue 742595. The amount of V.P.B. contained in the photosensitive layer is necessarily limited by necessity of having the resultant developed film be relatively transparent to visible light. If more than such small amount of V.P.B. is used in this film, the resultant developed film would be unalterably colored and useless in its intended use as a visible light film.

In one embodiment, this photothermographic material used in the method and apparatus of the present invention is similar to but significantly different from the dry silver film described in the Morgan et al patent and from the 3M Type 8500 dry silver film. This photothermographic material contains a significantly large concentration of antihalation colorant in the radiation layer of material. The large concentration of antihalation colorant slow the speed of the material slightly but provides significantly improved protection against halation caused by high power lasers, provides proper edge acuity and protects against dot gain in image reproducing materials, including printing plates or proofs, having high optical densities.

The photothermographic material comprises a photothermographic composition coated on a substrate, preferably transparent, wherein the photothermographic construction comprises a photographic silver salt, an organic silver salt, a reducing agent for the organic silver salt, binder, stabilizer and a large concentration of acutance agents, preferably an antihalation dye. The concentration of acutance agent should be between 0.02–0.09 by weight percent of the emulsion, and more preferably 0.04–0.07 by weight percent of the emulsion.

The photothermographic material must meet several criteria in order to function as a graphic arts contact film. The non-imaged areas must be sufficiently transparent to ultraviolet light, preferably, and near blue light such that when used as contact film an image can be produced on ultraviolet sensitized photopolymer and diazo photosensitive materials (360–440 nanometers), e.g., printing plates and color proofing films. The image area must have sufficient density so that light does not penetrate the image resulting in image degradation. In order to achieve the densities necessary at reasonable exposure times to meet industry specifications for a graphic arts contact film, it was necessary to increase the output of the laser diode in the imagesetter. Photothermographic films containing the typical 0.0025% acutance dye in the photosensitive layer were found to be inefficient for controlling halation when imaged with the higher output laser diodes. The amount of dye necessary to maintain the image quality, resolution and density requirements had to be increased significantly. C.I Basic Blue 742595 which has a maximum absorption between 500–675 nanometers can be incorporated into the photosensitive silver layer at levels between 0.02–0.09 by weight percent of the emulsion, and more preferably 0.04–0.07 by weight percent of the emulsion to meet the above criteria for applications as a graphic arts contact film..

The acutance dyes may be incorporated into the photothermographic element according to conventional techniques. The dyes may also be incorporated into antihalation layers according to techniques of the prior art as an antihalation backing layer, an antihalation underlayer or as an overcoat. It is also anticipated that similar red absorbing dyes would be suitable for use as acutance and antihalation dyes. Alternatively, acutance pigments may be used.

In photothermographic articles of the present invention the layer(s) that contain the photographic silver salt are referred to herein as emulsion layer(s). The photothermographic dry silver emulsions of this invention may be constructed of one or more layers on a substrate. Single layer constructions must contain the silver source material, the silver halide, the developer and binder as well optional additional materials such as toners, coating aids, and other adjuvants. Two-layer constructions must contain the silver source and silver halide in one emulsion layer (usually the layer adjacent to the substrate) and some of the other ingredients in the second layer or both layers, although two layer constructions comprising a single emulsion layer containing all the ingredients and a protective topcoat are envisioned.

It is customary to include an effective antifoggant in such photothermographic materials since, without an antifoggant, some generation of silver in the unexposed areas takes place upon thermal development, resulting in a poor differentiation between the image and background fog. Mercury (II) salts, preferably mercuric acetate and/or mercuric bromide, are added to the emulsions layer(s) for this purpose.

The light sensitive silver halide used in the present invention may typically be employed in a range of 0.75 to 25 mol percent and, preferably, from 2 to 20 mol percent of organic silver salt.

The silver halide may be any photosensitive silver halide such as silver bromide, silver iodide, silver chloride, silver bromoiodide, silver chlorogromoiodide, silver chlorobromide, etc. The silver halide may be in any form which is photosensitive including, but not limited to cubic, orthorhombic, tabular, tetrahedral, etc., and may have epitaxial growth of crystals thereon.

The silver halide used in the present invention may be employed without modification. However, it may be chemically sensitized with a chemical sensitizing agent such as a compound containing sulfur, selenium or tellurim etc., or a compound containing gold, platinum, palladium, rhodium or iridium, etc., a reducing agent such as a tin halide, etc., or a combination thereof. The details of these procedures are described in T. N. James *The Theory of the Photographic Process,* Fourth Edition, Chapter 5, pages 149 to 169.

The silver halide may be added to the emulsion layer in any fashion which places it in catalytic proximity to the silver source. Silver halide and the organic silver salt which are separately formed or "preformed" in a binder can be mixed prior to use to prepare a coating solution, but it is also effective to blend both of them in a ball mill for a long period of time. Further, it is effective to use a process which comprises adding a halogen-containing compound in the organic silver salt prepared to partially convert the silver of the organic silver salt to silver halide.

Methods of preparing these silver halide and organic silver salts and manners of blending them are known in the art and described in *Research Disclosure,* June 1978, item 17029, and U.S. Pat. No. 3,700,458.

The organic silver salt which can be used in the present invention is a silver salt which is comparatively stable to light, but forms a silver image when heated to 80 degrees Centigrade or higher in the presence of an exposed photocatalyst (such as photographic silver halide) and a reducing agent.

Further description of this photothermographic material may be had by reference to co-pending U.S. patent application Ser. No. 08/072,155, filed on even date herewith in the names of the present inventors, entitled "Photothermographic Material Adapted to be Sensitive to Radiation in the Red Range of the Electromagnetic Spectrum and Adapted to be Transparent to Radiation in the Ultraviolet Range of the Electromagnetic Spectrum", assigned to Minnesota Mining and Manufacturing Company, the assignee of the present invention, bearing identification number 49829USA1A, which is hereby incorporated by reference.

Alternatively, and with preference, a photothermographhic material having a separate antihalation layer may be used instead of the abovedescribed photothermographic material having the antihalation material located in the photosensitive layer. Preferably, the antihalation layer can be stripped from the film, either prior to or subsequent to development by heat.

In this embodiment, a photothermographic of the type described by Morgan et al or by 3M Type 8500 dry silver film modified by the addition of a strippable antihalation layer. Such a strippable antihalation suitable for this use is described in U.S. Pat. No. 4,477,562, Zeller-Pendrey, Dry Strippable Antihilation Layer for Photothermographic Film, assigned to Minnesota Mining and Manufacturing Company, assigned to the assignee of the present invention, which is hereby incorporated by reference.

EXAMPLES

The photothermographic material will be illustrated in detail in the following examples, but the embodiments of the present invention is not limited thereto.

A series of coating solutions were prepared as follows, differing only in the concentration of acutance dye used (C.I. Basic Blue 742595).

Example #1

Dry Silver Emulsion

Homogenate A: A non-preformed silver behenate full soap (129.7 g) was homogenized with 204.5 g of toluene, 603.6 g of methyl ethyl ketone, 57.9 g of methyl isobutyl ketone and 4.3 g of Butvar B-76 (Monsanto, polyvinyl butyral).

| | |
|---|---|
| Homogenate A | 731.5 g |
| 1-Methyl-2-Pyrolidinone | 0.97 g |
| Methyl ethyl ketone | 83.28 g |
| Mercuric Bromide (5.94% in Methanol) | 12.5 g |
| Hydrobromic Acid 48% | 5.31 g |
| Butvar B-76 (Monsanto, Polyvinyl butyral) | 89.56 g |
| VAGH (Union Carbide, vinyl acetate/vinyl chloride copolymer) | 19.81 g |
| 2,2'-Methylene-Bis-(4-Methyl-6-t-Butylphenol) | 13.13 g |
| Phthalazone | 5.43 g |
| C.I. Basic Blue 742595 Dye (.8% in Methanol) | 3.175 g |
| 2-(2-Thiazolid-3-carboxymethyl-4-one)-3-ethyl-5[(1-ethyl-2-quinolylidene) ethylidene]-4-thiazolidione CAS# 33006-61-0 (.71% in Methanol) | 8.883 g |
| Toluene | 26.44 g |

The above formulation gives rise to an emulsion containing 0.0025% acutance dye per weight of emulsion.

The ingredients were mixed in the order given at 21° C. under minus red light, then extrusion coated onto 4 mil transparent polyester base and dried to a dry coating weight of 12.9–14.0 g/m$^2$ (1.20–1.30 g/ft$^2$) at 93° C. for 3 minutes. A top coat comprising the following formulation was overcoated onto the first emulsion coating under the same drying conditions to a dry coating weight of 1.07–1.61 g/m$^2$ (0.10–0.15 g/ft$^2$):

| | |
|---|---|
| Methyl ethyl ketone | 959.0 g |
| VYNS-3 (Union Carbide, vinyl chloride/vinyl acetate copolymer) | 40.9 g |
| Phthalic Acid | 0.136 g |

Additional film samples with higher concentrations of acutance dye were prepared using the same procedures as described in Example #1 with the modifications specified for each respective example below;

| | |
|---|---|
| Example #2 | |
| 0.0115% Acutance Dye | 0.42 grams of a 0.59% C.I. Basic Blue 742595 Dye in Methanol was added to 26.5726 grams of the silver emulsion in Example #1. |
| Example #3 | |
| 0.0297% Acutance Dye | 1.27 grams of a .59% C.I. Basic Blue 742595 Dye in Methanol was added to 26.5726 grams of the silver emulsion in Example #1. |
| Example #4 | |
| .0585% Acutance Dye | 5.72 grams of a 1.4% C.I. Basic Blue 742595 Dye in Methanol was added to 136 grams of the silver emulsion in Example #1. |

The following example was prepared to show the effect of adding an additional strippable antihalation layer to the backside of the film generated in Example #1.

Example #5

An antihalation coating comprising the following formulation was coated onto the backside of the film described in Example #1.

| Antihalation Coating: | |
|---|---|
| Methyl Ethyl Ketone | 577.8 g |
| Toluene | 284.0 g |
| CAB 381-20 (Eastman Chemicals, Cellulose Acetate Butyrate) | 117.5 g |
| C.I. Basic Blue 742595 Dye | 20.6 g |

The ingredients were mixed in the order given at 21° C. then extrusion coated onto the backside of the film described in Example #1 and dried to a dry coating weight of 1.1–3.2 g/m$^2$ (0.1–0.3 g/ft$^2$) at 82° C. for 3 minutes.

The resulting coatings were evaluated by exposure in an 12" imager equipped with a 10 milliwatt HeNe laser followed by thermal processing at 127° C. for 17 seconds. In example 5 the films may be thermally processed with or without the antihalation layer intact. It may be preferable to remove the antihalation layer prior to thermal processing to eliminate possible adherence of the antihalation coating to the processor rollers. The settings for the exposure were varied to determine the optimum range of exposure for each of the corresponding films. As seen in the table below the effective exposure range of the films can be increased with the incorporation of higher concentrations of acutance dyes.

| | | |
|---|---|---|
| 0.0025% Acutance Dye in film: | 0.3 Neutral Density Filter | Usable range: 3 settings |
| 0.0115% Acutance Dye in film: | No Neutral Density Filter | Usable range: 4 settings |
| 0.0297% Acutance Dye in film: | No Neutral Density Filter | Usable range: 5 settings |

The films described in Examples 3, 4 and 5 were imaged over the entire dynamic range of the film; from image formation (toe of the DLogE trace) to over exposure (shoulder of the DLogE trace). This exposure range was accomplished by adjusting neutral density(nd) filtration in the laser imager and then using the 1 to 20 exposure adjustment scale on the imager to expose each film accordingly over the entire exposure range of each film. The image included 0 to 100% dots in 5% increments at 90 line per inch screen and double and triple line scans. Each sample was measured for visible $D_{MIN}$, UV $D_{MAX}$, 50% dot, and a microdensitometer traces was run each sample at the optimum exposure and two over exposure levels. The microdensitometer trace angle was measured between 0.5 and 1.0 density. The visible $D_{MAX}$ and 50% dot were plotted versus exposure and the slope of the percent dot line between 50% and 60% dot was calculated. The results were compared to a commercially available DuPont HeNe wet processed graphic arts film.

antihalation coating has a sharper toe at the over exposure setting than the DuPont film.

The most significant difference between the wet processed DuPont film and the Dry Silver Examples 3, 4 and 5 is the image density achieved while maintaining the dot characteristics. Even though the density achieved with the Dry Silver Examples 3, 4 and 5 are less than the density achieved by the traditional Dupont wet processed silver halide film, the Dry Silver Examples have been shown to function acceptably in imaging a printing plate or proof and Color Key® and Cromalin® color proofing films.

Method

The method and apparatus of the present invention use the photothermographic materials described above. Such mate-

| | Visible | | UV | | 50% | Micro | 50%/60% | |
|---|---|---|---|---|---|---|---|---|
| Sample | Exp. | Dmin | Dmax | Dmin | Dmax | Dot | .5–1.0 D | Slope |
| DuPont | 1 | 0.04 | 0.18 | 0.08 | 0.22 | 16 | | [2.5] |
| (1.3 nd) | 3 | 0.03 | 3.00 | 0.08 | 2.90 | 53 | 86.8 | |
| | 4 | 0.03 | 3.92 | 0.08 | 3.35 | 56 | | |
| | 5 | 0.03 | 4.27 | 0.08 | 3.47 | 58 | 86.8 | |
| | 7 | 0.03 | 4.28 | 0.08 | 3.50 | 62 | 86.8 | |
| | 10 | 0.03 | 4.28 | 0.08 | 3.49 | 68 | | |
| | 13 | 0.04 | 4.28 | 0.08 | 3.50 | 72 | | |
| | 16 | 0.03 | 4.28 | 0.08 | 3.49 | 75 | | |
| | 19 | 0.03 | 4.28 | 0.08 | 3.55 | 79 | | |
| Example 3 | 1 | 0.21 | 0.26 | 0.30 | 0.35 | 4 | | [3.7] |
| (0.1 nd) | 3 | 0.21 | 1.25 | 0.30 | 1.06 | 29 | | |
| | 6 | 0.20 | 1.57 | 0.29 | 1.30 | 54 | | |
| | 7 | 0.20 | 1.69 | 0.29 | 1.40 | 58 | | |
| | 8 | 0.23 | 1.79 | 0.30 | 1.47 | 61 | 83.9 | |
| | 9 | 0.20 | 1.92 | 0.31 | 1.55 | 73 | | |
| | 10 | 0.23 | 1.93 | 0.30 | 1.58 | 67 | | |
| | 13 | 0.22 | 2.09 | 0.30 | 1.71 | 77 | 83.9 | |
| | 16 | 0.20 | 2.25 | 0.30 | 1.87 | 78 | 83.3 | |
| | 19 | 0.21 | 2.40 | 0.31 | 1.99 | 86 | | |
| Example 4 | 5 | 0.25 | 1.05 | 0.32 | 0.93 | 32 | | [1.8] |
| (0.1 nd) | 8 | 0.25 | 1.52 | 0.32 | 1.27 | 51 | | |
| | 10 | 0.28 | 1.66 | 0.36 | 1.39 | 55 | 82.8 | |
| | 11 | 0.25 | 1.69 | 0.32 | 1.41 | 59 | | |
| | 12 | 0.28 | 1.76 | 0.35 | 1.48 | 57 | 83.5 | |
| | 13 | 0.25 | 1.79 | 0.32 | 1.51 | 60 | | |
| | 14 | 0.28 | 1.86 | 0.34 | 1.56 | 60 | 83.0 | |
| | 15 | 0.25 | 1.88 | 0.32 | 1.59 | 62 | | |
| | 16 | 0.26 | 1.94 | 0.32 | 1.64 | 62 | | |
| | 19 | 0.26 | 2.04 | 0.33 | 1.73 | 69 | | |
| Example 5 | 4 | 0.16 | 1.01 | 0.27 | 0.94 | 40 | | [2.4] |
| (0.0 nd) | 6 | 0.14 | 1.79 | 0.28 | 1.48 | 52 | | |
| | 7 | 0.16 | 1.93 | 0.27 | 1.60 | 56 | 84.7 | |
| | 8 | 0.15 | 2.01 | 0.27 | 1.62 | 57 | | |
| | 9 | 0.15 | 2.10 | 0.26 | 1.72 | 58 | 84.7 | |
| | 10 | 0.14 | 2.17 | 0.28 | 1.77 | 61 | | |
| | 12 | 0.15 | 2.37 | 0.27 | 1.92 | 65 | 85.2 | |
| | 14 | 0.14 | 2.49 | 0.26 | 1.99 | 68 | | |
| | 17 | 0.15 | 2.66 | 0.26 | 2.16 | 70 | | |
| | 20 | 0.15 | 2.79 | 0.28 | 2.30 | 74 | | |

The relationship between exposure and the rate of change in dot percent between fifty and sixty dot percent is a method for evaluating exposure latitude. The data above shows that Examples 4 and 5 have an exposure latitude comparative to the DuPont wet processed silver halide film. A second way of evaluating exposure latitude concerns the angle of the microdensitometer trace between 0.5 and 1.0 density and the relationship between exposure level and the change in that angle which gives an indication of edge acuity as a function of exposure level. The DuPont film has a higher angle at the optimum exposure than the Dry Silver Examples 3 and 4; however, the Dry Silver Example 5 with the backside rials in combination with the method and apparatus described herein allows printing of image reproducing materials including plates or proofs for the newspaper and other industries to be prepared using "dry chemistry".

The preparation of printing plates or proofs utilized in the newspaper printing industry utilizing the present invention involves several steps.

The image desired to be created on the printing is prepared conventionally, typically by using computer based equipment. This predetermined image is then transferred to photographic film by exposing the film to radiation from a radiation source, typically an imagesetter. Such imagesetting equipment, well known in the art, uses a computer based image to drive a radiation generator, generally a laser or laser diode which is scanned across radiation sensitive film. Modulation of the radiation based upon the computer based image creates a corresponding latent image on the radiation sensitive film.

Typically this imagesetting equipment emits radiation generally in the red region, preferably, or blue region of the electromagnetic spectrum. Examples the radiation emitters which can be used in the imagesetting equipment include laser diodes emitting radiation at approximately 670 nanometers, helium-neon lasers emitting radiation at approximately 633 nanometers and argon ion lasers emitting radiation at approximately 514 nanometers.

Typical imagesetting equipment use a laser having a power output in the neighborhood of approximately 1 milliwatt. Due in part to the lower light sensitivity of photothermographic materials and such materials containing antihalation colorant and in part to speed requirements of imagesetting equipment, it is preferable to use an imagesetting equipment having a laser with a higher output level. It is preferred that the laser or laser diode have an output level of at least 5 milliwatts and, still more preferably, an output level of about 10 milliwatts or more.

If the photothermographic material having a strippable antihalation layer is used, the strippable antihalation layer may be stripped from the photothermographic material at this time, before development, or later after the latent image has been developed by heat. In some circumstances, stripping the antihalation layer from the photothermographic material before development allows the material to physically perform better, e.g., lay flatter, don't curl, etc., in the developer and, hence, is preferred in some circumstances.

The latent image in the photothermographic material is then developed. Heat is applied to the photothermographhic material in a developer. The developer, preferably, will heat the photothermographhic material to approximately 265 degrees Farenheit for approximately 17 seconds in a contact style processor (drum style) or approximately 265 degrees Farenheit for approximately 60 seconds in a non-contact style processor. Preferably, the developer will maintain the photothermographhic material within approximately 1 degree Fahrenheit of the desired developing temperature.

Although it is not required from the chemistry and optics of the method of the present invention, if the photothermographic material having a strippable antihalation layer is used, the strippable antihalation layer may be stripped from the photothermographic material at this time, before subsequent ultraviolet exposure, for aesthetic reasons.

The developed film is then placed next to a photographic plate, or proof, and exposed to ultraviolet light. The ultraviolet light creates a pattern in the photographic plate corresponding to the developed image. The plate can then be inked and used to print the newspaper copy. Correspondingly, the proof created from the developed film can be viewed.

FIG. 1 illustrates a flow chart of the method of the present invention. The predetermined image 110 intended to imparted to the image reproducing material is used. The photothermographic material 112 is used as an intermediary between the predetermined image 110 and the image reproducing material 114. The photothermographic material 112 is exposed (116) to radiation in the range of the 630–700 nanometers modulated in accordance with the predetermined image 110 to produce a latent image representing the predetermined image 110 in the photothermographic material 112. The photothermographic material 112 is heated (118) to develop the latent image in the photothermographic material 112. The image reproducing material 114 is imaged (120) with ultraviolet radiation using the photothermographic material 112 as a mask. The resultant image reproducing material 114 contains the predetermined image 110 and is suitable for use in printing newspapers.

Apparatus

Figure 2:
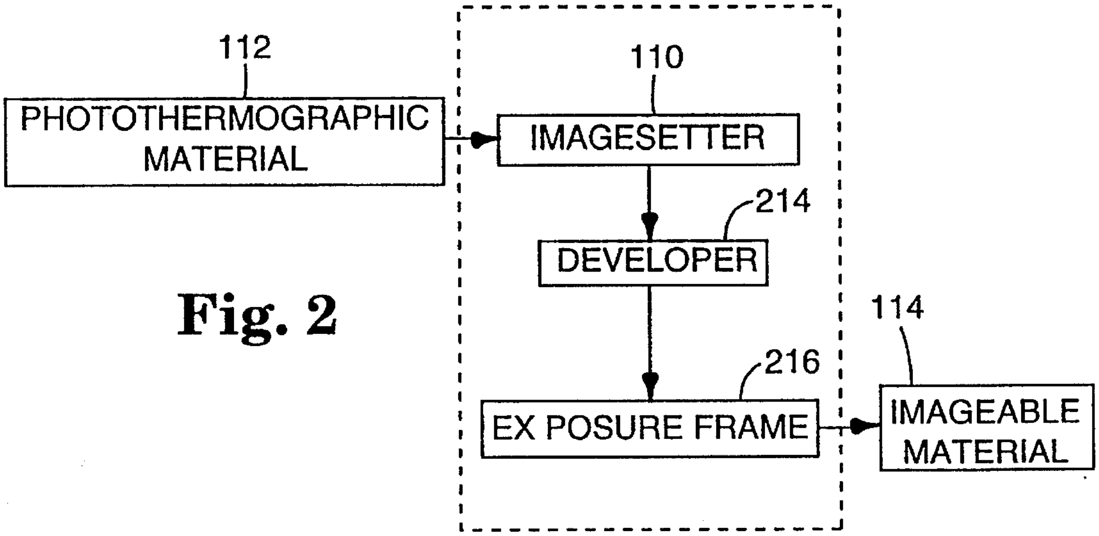
FIG. 2 is a block diagram illustrating the apparatus of the present invention.

The apparatus 210 of the present invention is illustrated in block diagram form in FIG. 2. The apparatus uses photothermographic material, or film, 112 in an imagesetting 212 to accomplish the exposing step 116 illustrated in FIG. 1. The photothermographic material 112 is then transferred to a developer 214 which accomplishes the heating step 118 illustrated in FIG. 1. The developed photothermographic material 112 is utilized in conjunction with a conventional image reproducing material 114 in exposure frame 216 to accomplish the imaging step 120 illustrated in FIG. 1.

Imagesetter

An imagesetter 212 preferably is used to accomplish the exposing step 116 illustrated in FIG. 1. This equipment is well known in the art and many different imagesetters, modified with a higher power laser as discussed below, could be used advantageously in the method and apparatus of the present invention. An example of an imagesetter 212 which would be suitable for use in the present method and apparatus is described in U.S. Pat. No. 4,803,497, Kennedy, Jr. et al, Laser Diode Output Stabilization in a Laser Imagesetter, which is hereby incorporated by reference.

Such imagesetting equipment 212, well known in the art, uses a computer based image to drive a radiation generator, generally a laser, laser diode or cathode ray tube, which is scanned across radiation sensitive film. Modulation of the radiation based upon the computer based image creates a corresponding latent image on the radiation sensitive film.

Common imagesetting equipment 212 emits radiation generally in the red region of the electromagnetic spectrum. Examples the radiation emitters which can be used in the imagesetting equipment include laser diodes emitting radiation at approximately 670 nanometers and helium-neon lasers emitting radiation at approximately 633 nanometers.

Typical imagesetting equipment 212 use a laser having a power output in the neighborhood of approximately 1 milliwatt. Due in part to the slower nature of the photographic material containing so much antihalation colorant and in part to speed requirements of imagesetting equipment, it is preferable to use an imagesetting equipment 212 having a laser with a higher output level. It is preferred that the laser or laser diode have an output level of at least 5 milliwatts and, still more preferably, an output level of about 10 milliwatts or more.

Developer

A developer 214 is utilized to process the photographic material by heating to develop the latent image contained therein. The developer, preferably, will heat the photothermographhic material to approximately 265 degrees Farenheit for approximately 17 seconds in a contact style processor (drum style) or approximately 265 degrees Farenheit for approximately 60 seconds in a non-contact style processor. Preferably, the developer 214 will maintain the photothermographhic material 112 within approximately 1 degree Fahrenheit of the desired developing temperature.

Figure 3:
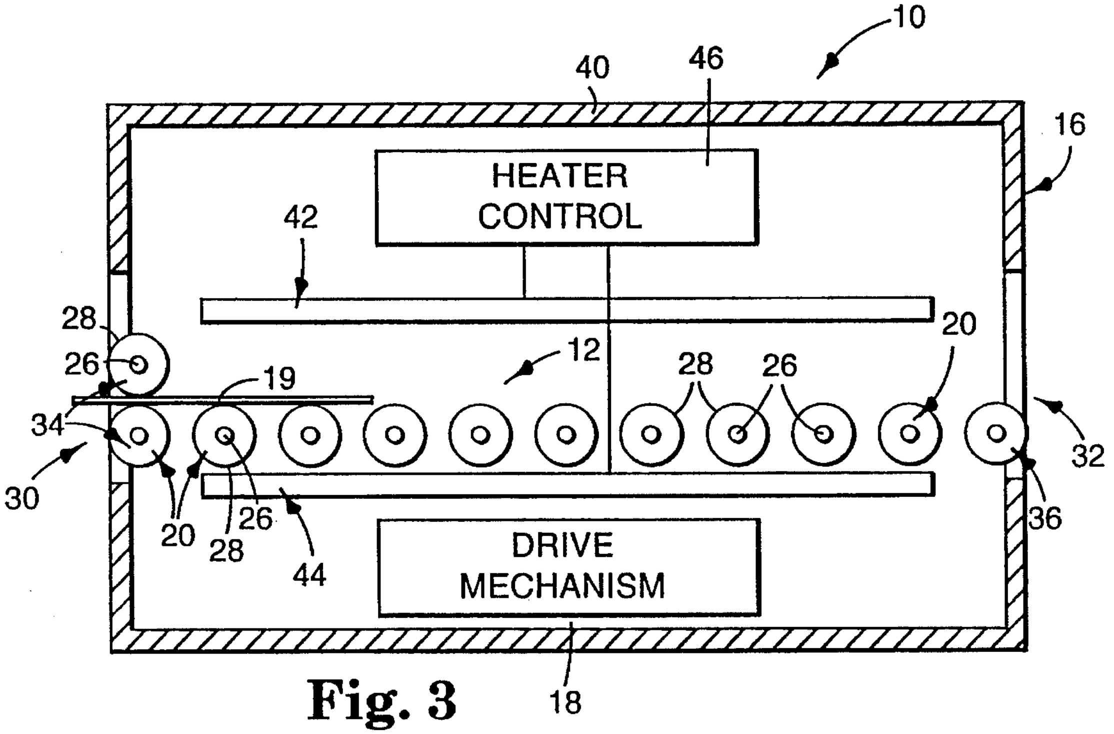
FIG. 3 is a diagrammatic view of a developer used in the apparatus of the present invention.

An example of a preferred developer 214 is illustrated in the diagrammatic view illustrated in FIG. 3 where the developer is referred to as a dry silver thermophotographic film processor 10. Film processor 10 includes a generally flat and horizontally oriented bed 12 of film support material 28 mounted within an oven 16, and a drive mechanism 18 for driving the bed of film support material. The film support material 28 has a low heat capacity, and typically foam, material which retains insubstantial amounts of heat with respect to that generated by the oven and needed to develop the film. Transporting sheets of film such as 19 through the oven 16 on this low heat capacity material 28 allows the film to develop without visible patterns that might otherwise be caused by differentials in the amount of heat, i.e., hot spots, to which portions of the film are exposed due to varying physical contact with the transport material. The image on the developed film will therefore have a uniform intensity.

Bed 12 is formed by a plurality of elongated rollers 20 (ten are shown). Rollers 20 include support rods 26 with cylindrical sleeves of the film support material 28 surrounding the external surface of the rods. Rods 26 are rotatably mounted to the opposite sides of oven 16 to orient rollers 20 in a spaced, generally parallel relationship about a linear transport path between an entrance 30 and exit 32 of the oven 16. The generally flat and horizontally oriented nature of bed 12 enables frictional engagement of the bed 12 by sheets of film 19. Oven entrance 30 is a nip formed between a pair of adjacent entrance rollers 34. Entrance and exit rollers 34 and 36 can be identical in structure to rollers 20, and include rods 26 surrounded by sleeves of film support material 28. Rollers 20, 34 and 36 are driven, preferably at the same speed, by drive mechanism 18. In one embodiment (not shown), drive mechanism 18 includes a motor coupled to all rolls 26 by a gear linkage.

Oven 16 includes an enclosure 40 with heat sources 42 and 44 mounted above and below bed 12 of rollers 20. The temperature within oven 16 is controlled by heater control 46 which is coupled to both heat sources 42 and 44. Heat source 42 is a multiple zone source with plural heating elements. Heater control 46 includes a separate controller, such as a RTD controller (not shown), to independently control each heating element. Heat source 44 can be configured and controlled in a manner substantially identical to that of heat source 42. By independently controlling a number of heating elements, the temperature within oven 16 can accurately controlled and maintained.

As noted above, film support material 28 has a sufficiently low heat capacity to prevent any visible patterns on the developed film due to contact with the bed 12. Materials 28 having these characteristics will typically be low density, low thermal mass and low thermal conductivity foam materials. Materials 28 of this type will retain sufficiently low amounts of residual heat that any such heat will not contribute to the development of the film 19. In one embodiment of the processor 10, Willtec melamine foam having a density of 0.75 pounds per cubic foot (12.0 kg/m$^3$) and a thermal conductivity (K) of 0.24 is used for support material 28.

Sheets of film 19 can be developed by feeding them into entrance 30 with the emulsion side down, facing rollers 20. This film 19 orientation prevents the film 19 from curling and contacting heat source 42 during development. The dwell time within oven 16, i.e., the speed at which rollers 20 are driven and/or the length of the transport path, and the temperature within the oven 16 are optimized in a known manner to properly develop the film 19. In one embodiment, processor 10 is operated in such a manner as to expose sheets of film 19 to a temperature in the range of 245 degrees Fahrenheit to 300 degrees Fahrenheit (118 to 249 degrees Centigrade) for about 60 seconds. These parameters will, of course, vary with the particular characteristics of the film 19 being developed. Although not shown, a cooling chamber can be positioned adjacent exit 32 of processor 10 to quickly lower the temperature of the developed film 19 for subsequent handling.

Exposure Frame

An exposure frame 216 is utilized to image the image reproducing material 114 in cooperation with the developed photothermographic material 112. The image reproducing material 114 which is sensitive to ultraviolet is placed adjacent the developed photothermographic material 112. The combination is then exposed to ultraviolet radiation which creates a latent image in the image reproducing material which is subsequently processed to form a relief image.

Such exposure frames are well known in the industry. Examples of such exposure frames 216 are generally described in Bruno, Michael H., *Principles of Color Proofing*, GAMA Communications, Salem, N.H. (1986), Chapter II, "The Color Reproduction Process" and in *The Lithographers Manual* (Blair and Destree), The Graphic Arts Technical Foundation, Inc., Pittsburgh, Pa. (1988), Chapter 11, "Platemaking", both of which are hereby incorporated by reference.

Thus, there has been shown and described a novel method and apparatus for producing printing plates or proofs. It is to be recognized and understood that modifications substitutions in the form and the details of the present invention can be made without departing from the scope of the following claims.

What is claimed is:

1. A method for producing an image reproducing material having a predetermined image, comprising the steps of:

exposing a photothermographic material having a polymeric base supporting at least one photosensitive layer, capable of being developed by heat, to radiation in the range of the 630–700 nanometers modulated in accordance with said predetermined image to produce a latent image representing said predetermined image in said photothermographic material, said photothermographic material containing therein an antihalation colorant in an amount greater than 0.02 percent by weight, said antihalation colorant being active to radiation in the red range of the electromagnetic spectrum and being transparent to radiation in the ultraviolet range of the electromagnetic spectrum;

heating said photothermographic material to develop said latent image in said photothermographic material;

imaging said image reproducing material with ultraviolet radiation using said photothermographic material as a mask;

said image producing material retaining therein said antihalation colorant in said amount during said imaging step.

2. A method as in claim 1 wherein said antihalation colorant comprises a ultraviolet transparent acutance dye.

3. A method as in claim 2 wherein said ultraviolet transparent acutance dye comprises V.P.B. (victoria pure blue).

4. A method as in claim 3 wherein said at least one photosensitive layer further comprises a photographic silver salt, an organic silver salt, a reducing agent for the organic silver salt, a binder and a stabilizer.

5. A method as in claim 4 wherein the concentration of V.P.B. is in the range of 0.02 to 0.09 percent by weight of said photosensitive layer.

6. A method as in claim 1 wherein said exposing step is accomplished with a helium-neon laser having at a power level of at least 5 milliwatts.

7. A method as in claim 1 wherein said imaging step directly follows said heating step.

8. A method for producing an image reproducing material having a predetermined image, comprising the steps of:

exposing a photothermographic material having a polymeric base supporting at least one photosensitive layer, capable of being developed by heat, to radiation at a first wavelength modulated in accordance with said predetermined image to produce a latent image representing said predetermined image in said photothermographic material, said photothermographic material containing therein an antihalation colorant in an amount greater than 0.02 percent by weight of said photosensitive layer, said antihalation colorant being active to radiation in said first wavelength and being transparent to radiation at a second wavelength;

heating said photothermographic material to develop said latent image in said photothermographic material;

imaging said image reproducing material with radiation at said second wavelength using said photothermographic material as a mask;

said image reproducing material retaining therein said antihalation colorant in said amount during said imaging step.

9. A method as in claim 8 wherein said first wavelength is in the range of from 630 to 700 nanometers.

10. A method as in claim 9 wherein said second wavelength is in the range of from 360 to 450 nanometers.

11. A method as in claim 10 wherein said antihalation colorant comprises a ultraviolet transparent acutance dye.

12. A method as in claim 11 wherein said ultraviolet transparent acutance dye comprises V.P.B. (victoria pure blue).

13. A method as in claim 12 wherein said at least one photosensitive layer further comprises a photographic silver salt, an organic silver salt, a reducing agent for the organic silver salt, a binder and a stabilizer.

14. A method as in claim 13 wherein the concentration of V.P.B. is in the range of 0.02 to 0.09 percent by weight.

15. A method as in claim 10 wherein said exposing step is accomplished with a helium-neon laser having at a power level of at least 5 milliwatts.

16. A method as in claim 10 wherein said imaging step directly follows said heating step.

17. An apparatus for producing an image reproducing material having a predetermined image, comprising:

means for exposing a photothermographic material having a polymeric base supporting at least one photosensitive layer, capable of being developed by heat, to radiation in the range of the 630–700 nanometers modulated in accordance with said predetermined image to produce a latent image representing said predetermined image in said photothermographic material, said photothermographic material containing therein an antihalation colorant in an amount greater than 0.02 percent by weight, said antihalation colorant being active to radiation in the red range of the electromagnetic spectrum and being transparent to radiation in the ultraviolet range of the electromagnetic spectrum;

means for heating said photothermographic material to develop said latent image in said photothermographic material; and means for imaging said image reproducing material with ultraviolet radiation using said photothermographic material as a mask;

said image reproducing material retaining therein said antihalation colorant in said amount when said image reproducing material is used in said means for imaging.

18. An apparatus as in claim 17 wherein said means for exposing comprises a laser having an output power of at least 5 milliwatts.

19. An apparatus as in claim 18 wherein said laser comprises a helium-neon laser.

20. An apparatus as in claim 19 wherein said helium-neon laser has an output power of approximately 10 milliwatts.

21. An apparatus as in claim 17 wherein said antihalation colorant comprises a ultraviolet transparent acutance dye.

22. An apparatus as in claim 21 wherein said ultraviolet transparent acutance dye comprises V.P.B. (victoria pure blue).

23. An apparatus as in claim 22 wherein said at least one photosensitive layer further comprises a photographic silver salt, an organic silver salt, a reducing agent for the organic silver salt, a binder and a stabilizer.

24. An apparatus as in claim 23 wherein the concentration of V.P.B. is in the range of 0.02 to 0.09 percent by weight.

25. An apparatus for producing an image reproducing material having a predetermined image, comprising:

means for exposing a photothermographic material having a polymeric base supporting at least one photosensitive layer, capable of being developed by heat, to radiation at a first wavelength modulated in accordance with said predetermined image to produce a latent image representing said predetermined image in said photothermographic material, said photothermographic material containing therein an antihalation colorant in an amount greater than 0.02 percent by weight, said antihalation colorant being active to radiation in said first wavelength and being transparent to radiation at a second wavelength;

means for heating said photothermographic material to develop said latent image in said photothermographic material;

means for imaging said image reproducing material with radiation at said second wavelength using said photothermographic material as a mask;

said image reproducing material retaining therein said antihalation colorant in said amount when said image reproducing material is used in said means for imaging.

26. An apparatus as in claim 25 wherein said means for exposing comprises a laser having an output power of at least 5 milliwatts.

27. An apparatus as in claim 26 wherein said laser comprises a helium-neon laser.

28. An apparatus as in claim 27 wherein said helium-neon laser has an output power of approximately 10 milliwatts.

29. An apparatus as in claim 26 wherein said first wavelength is in the range of from 630 to 700 nanometers.

30. An apparatus as in claim 29 wherein said second wavelength is in the range of from 360 to 450 nanometers.

31. An apparatus as in claim 30 wherein said antihalation colorant comprises a ultraviolet transparent acutance dye.

32. An apparatus as in claim 31 wherein said ultraviolet transparent acutance dye comprises V.P.B. (victoria pure blue).

33. An apparatus as in claim 32 wherein said at least one photosensitive layer further comprises a photographic silver salt, an organic silver salt, a reducing agent for the organic silver salt, a binder and a stabilizer.

34. An apparatus as in claim 33 wherein the concentration of V.P.B. is in the range of 0.02 to 0.09 percent by weight.

* * * * *